United States Patent
Yabuuchi et al.

(10) Patent No.: US 11,223,934 B2
(45) Date of Patent: Jan. 11, 2022

(54) ROAD-VEHICLE COMMUNICATION SYSTEM, ROADSIDE COMMUNICATION APPARATUS, IN-VEHICLE COMMUNICATION APPARATUS, AND ROAD-VEHICLE COMMUNICATION METHOD

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Yasuhiro Yabuuchi, Mie (JP); Yuichi Kodama, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 308 days.

(21) Appl. No.: 16/469,505

(22) PCT Filed: Dec. 1, 2017

(86) PCT No.: PCT/JP2017/043293
§ 371 (c)(1),
(2) Date: Jun. 13, 2019

(87) PCT Pub. No.: WO2018/110323
PCT Pub. Date: Jun. 21, 2018

(65) Prior Publication Data
US 2020/0008027 A1 Jan. 2, 2020

(30) Foreign Application Priority Data
Dec. 14, 2016 (JP) .............................. JP2016-242363

(51) Int. Cl.
*H04W 4/00* (2018.01)
*H04W 4/48* (2018.01)
(Continued)

(52) U.S. Cl.
CPC ........ *H04W 4/48* (2018.02); *G08G 1/096783* (2013.01); *G08G 1/123* (2013.01);
(Continued)

(58) Field of Classification Search
CPC .......... H04W 4/44; H04W 4/48; G08G 1/123; G08G 1/096783; H04L 9/3268; H04L 67/12; H04L 2209/84
See application file for complete search history.

(56) References Cited

U.S. PATENT DOCUMENTS

| 10,885,780 B1* | 1/2021 | Bseileh | G08G 1/0112 |
| 2002/0129988 A1* | 9/2002 | Stout | B62D 6/008 180/400 |

(Continued)

FOREIGN PATENT DOCUMENTS

| JP | 2002-374561 A | 12/2002 |
| JP | 2003-051094 A | 2/2003 |

(Continued)

OTHER PUBLICATIONS

International Search Report, Application No. PCT/JP2017/043293, dated Feb. 27, 2018. ISA/Japan Patent Office.

*Primary Examiner* — Peter D Nolan
*Assistant Examiner* — Wae L Louie
(74) *Attorney, Agent, or Firm* — Honigman LLP

(57) ABSTRACT

A road-vehicle communication system includes an in-vehicle communication apparatus and a roadside communication apparatus, the in-vehicle communication apparatus has a vehicle information transmission unit that transmits vehicle information related to a vehicle. The roadside com-
(Continued)

munication apparatus has a storage unit storing a plurality of pieces of data to be transmitted to the in-vehicle communication apparatus. A vehicle information reception unit receives vehicle information transmitted from the in-vehicle communication apparatus. A transmission data generation unit combines a plurality of pieces of data stored in the storage unit to generate a single piece of transmission data. A data transmission unit transmits the data generated by the transmission data generation unit to the in-vehicle communication apparatus. A combined number adjustment unit adjusts the number of pieces of data to be combined by the transmission data generation unit, based on vehicle information received by the vehicle information reception unit.

17 Claims, 11 Drawing Sheets

(51) Int. Cl.
    *H04W 4/44*     (2018.01)
    *G08G 1/0967*     (2006.01)
    *G08G 1/123*     (2006.01)
    *H04L 9/32*     (2006.01)
    *H04L 29/08*     (2006.01)

(52) U.S. Cl.
    CPC ............ *H04L 9/3268* (2013.01); *H04L 67/12* (2013.01); *H04W 4/44* (2018.02); *H04L 2209/84* (2013.01)

(56) References Cited

U.S. PATENT DOCUMENTS

| | | | |
|---|---|---|---|
| 2009/0235071 A1 | 9/2009 | Bellur et al. | |
| 2013/0067220 A1 | 3/2013 | Ando et al. | |
| 2014/0303881 A1 | 10/2014 | Ando et al. | |
| 2015/0358170 A1 | 12/2015 | Ando et al. | |
| 2017/0267276 A1* | 9/2017 | Kodera | B62D 6/008 |
| 2018/0286235 A1* | 10/2018 | Fujisawa | G08G 1/0116 |
| 2019/0206253 A1* | 7/2019 | Amano | G08G 1/096791 |
| 2019/0251847 A1* | 8/2019 | Wu | G01S 19/48 |
| 2019/0322277 A1* | 10/2019 | Kuroki | G01S 13/931 |
| 2020/0008027 A1* | 1/2020 | Yabuuchi | G08G 1/09 |
| 2020/0031339 A1* | 1/2020 | Tanaka | B60W 30/17 |
| 2020/0086886 A1* | 3/2020 | Kaneko | B60W 40/02 |
| 2020/0098266 A1* | 3/2020 | Tanaka | B60W 30/16 |
| 2020/0312125 A1* | 10/2020 | Oishi | H04W 4/46 |
| 2020/0349843 A1* | 11/2020 | Liu | B60R 21/00 |
| 2021/0118287 A1* | 4/2021 | Fujimoto | G08G 1/164 |

FOREIGN PATENT DOCUMENTS

| | | |
|---|---|---|
| JP | 2004-117191 A | 4/2004 |
| JP | 2007-060539 A | 3/2007 |
| JP | 2007-078366 A | 3/2007 |
| JP | 2007-264825 A | 10/2007 |
| JP | 2011-035721 A | 2/2011 |

\* cited by examiner

FIG. 5

Adjustment of
Combined Number

| Vehicle Speed | Combined Number |
|---|---|
| 0～10 km/h | 10 |
| 10～20 km/h | 9 |
| 20～30 km/h | 8 |
| 30～40 km/h | 7 |
| 40～50 km/h | 6 |
| 50～60 km/h | 5 |
| 60～70 km/h | 4 |
| 70～80 km/h | 3 |
| 80～90 km/h | 2 |
| 90 km/h～ | 1 |

\* Note that if the distance to the vehicle exceeds 90 m, the combined number is set to 1 regardless of vehicle speed.

FIG. 6

Adjustment of Transmission Frequency

| Distance | Transmission Cycle |
|---|---|
| 0〜20m | 1000ms |
| 20〜40m | 500ms |
| 40〜60m | 100ms |
| 60〜80m | 50ms |
| 80m〜 | 10ms |

Adjustment of Transmission
Frequency according to Necessity

| Remaining period | Necessity | Adjustment of Transmission Frequency |
|---|---|---|
| ≥ 1 month | 0 | No adjustment |
| < 1 month, ≥ 1 week | 1 | Shorten transmission cycle by 1 step |
| < 1 week | 2 | Shorten transmission cycle by 2 steps |
| Expired | 3 | Shorten transmission cycle by 3 steps |

FIG. 12

Adjustment of Combined Number and Transmission
Frequency according to Roadside Communication Apparatus

| Communication Capacity of Roadside Communication Apparatus | Adjustment of Combined Number | Adjustment of transmission frequency |
|---|---|---|
| 1 (low) | Reduce combined number by 1 step | Shorten transmission cycle by 1 step |
| 2 (moderate) | No adjustment | No adjustment |
| 3 (high) | Increase transmission cycle by 1 step | Lengthen transmission cycle by 1 step |

ROAD-VEHICLE COMMUNICATION SYSTEM, ROADSIDE COMMUNICATION APPARATUS, IN-VEHICLE COMMUNICATION APPARATUS, AND ROAD-VEHICLE COMMUNICATION METHOD

CROSS-REFERENCE TO RELATED APPLICATIONS

This application is the U.S. national stage of PCT/JP2017/043293 filed on Dec. 1, 2017, which claims priority of Japanese Patent Application No. JP 2016-242363 filed on Dec. 14, 2016, the contents of which are incorporated herein.

TECHNICAL FIELD

The present invention relates to a road-vehicle communication system in which a roadside communication apparatus installed on a road communicates with an in-vehicle communication apparatus mounted in a vehicle, the roadside communication apparatus, the in-vehicle communication apparatus, and a road-vehicle communication method.

BACKGROUND

Heretofore, road-vehicle communication systems that provide various types of information using wireless signals from a roadside communication apparatus installed on a road to an in-vehicle communication apparatus mounted in a vehicle have been practically used. The information that is transmitted from the roadside communication apparatus to the in-vehicle communication apparatus can be information such as the lighting state of a traffic light or surrounding traffic information, for example. A vehicle that receives such information with the in-vehicle communication apparatus is able to perform processing such as alerting the driver of the vehicle or driving assistance control of the vehicle, for example. Also, in recent years, it has become possible for the roadside communication apparatus and the in-vehicle communication apparatus to exchange various types of information, with communication that is performed between the inside and outside of the vehicle desirably being highly secure, and communication technologies such as digital certificates and encryption being used.

JP 2007-60539A describes a certificate verification system in which a user who wants to use a service device acquires a certificate from the service device with his or her mobile terminal, verifies the reliability of the acquired certificate, and registers the verification result in the mobile terminal as reliability information. With this certificate verification system, in the case where reliability information is registered in a mobile terminal, it can be judged that the service device is reliable according to this information, and provision of services can be received from the service device.

In the certificate verification system described in JP 2007-60539A, certificate information is transmitted and received by wireless communication between a service device and the mobile terminal of a user, with this wireless communication being highly likely to be performed in a stable environment, and communication easily being performed again even in the event of wireless communication failure. In contrast, wireless communication that is performed between a roadside communication apparatus and an in-vehicle communication apparatus is not necessarily performed in a stable environment, and it is difficult to perform communication again after the vehicle has moved away. Also, one roadside communication apparatus needs to perform wireless communication with in-vehicle communication apparatuses mounted in a plurality of vehicles that are driving along the road. In the case of transmitting information such as lighting information of a traffic light and surrounding traffic information, for example, the roadside communication apparatus need only simultaneously transmit the information to the plurality of in-vehicle communication apparatuses. However, in the case where information that differs for every in-vehicle communication apparatus such as digital certificate information needs to be transmitted, the amount of communication between the roadside communication apparatus and the in-vehicle communication apparatus could increase.

The present invention has been made in view of these circumstances, and an object of the invention is to provide a road-vehicle communication system, a roadside communication apparatus, an in-vehicle communication apparatus and a road-vehicle communication method that can suppress an increase of the amount of communication in the case where the roadside communication apparatus needs to transmit information that differs for every in-vehicle communication apparatus such as digital certificate information, for example.

SUMMARY

A road-vehicle communication system according to the present invention includes an in-vehicle communication apparatus mounted in a vehicle and a roadside communication apparatus installed on a road, the in-vehicle communication apparatus having a vehicle information transmission unit configured to transmit vehicle information related to the vehicle, the roadside communication apparatus having a storage unit configured to store a plurality of pieces of data to be transmitted to the in-vehicle communication apparatus, a vehicle information reception unit configured to receive vehicle information transmitted from the in-vehicle communication apparatus, a transmission data generation unit configured to combine a plurality of pieces of data stored in the storage unit to generate a single piece of transmission data, and a data transmission unit configured to transmit the data generated by the transmission data generation unit to the in-vehicle communication apparatus, and the road-vehicle communication system including a combined number adjustment unit configured to adjust the number of pieces of data to be combined by the transmission data generation unit, based on vehicle information received by the vehicle information reception unit.

Also, in the road-vehicle communication system according to the present invention, the vehicle information transmission unit transmits speed information of the vehicle, and the combined number adjustment unit increases the number of pieces of data to be combined for a slower speed of the vehicle in which the in-vehicle communication apparatus serving as a data transmission destination is mounted, and decreases the number of pieces of data to be combined for a faster speed.

Also, the road-vehicle communication system according to the present invention includes a transmission frequency adjustment unit configured to adjust a frequency at which the data transmission unit transmits data to the in-vehicle communication apparatus, based on vehicle information received by the vehicle information reception unit.

Also, in the road-vehicle communication system according to the present invention, the vehicle information transmission unit transmits position information on the vehicle, and the transmission frequency adjustment unit increases the transmission frequency for a longer distance to the vehicle in which the in-vehicle communication apparatus serving as a data transmission destination is mounted, and decreases the transmission frequency for a shorter distance.

Also, in the road-vehicle communication system according to the present invention, the vehicle information transmission unit transmits information related to a necessity of data that is transmitted by the roadside communication apparatus, and the combined number adjustment unit or the transmission frequency adjustment unit performs adjustment according to the necessity.

Also, a road-vehicle communication system according to the present invention includes an in-vehicle communication apparatus mounted in a vehicle and a roadside communication apparatus installed on a road, the in-vehicle communication apparatus having a vehicle information transmission unit configured to transmit vehicle information related to the vehicle, the roadside communication apparatus having a storage unit configured to store a plurality of pieces of data to be transmitted to the in-vehicle communication apparatus, a vehicle information reception unit configured to receive vehicle information transmitted from the in-vehicle communication apparatus, a transmission data generation unit configured to combine a plurality of pieces of data stored in the storage unit to generate a single piece of transmission data, and a data transmission unit configured to transmit the data generated by the transmission data generation unit to the in-vehicle communication apparatus, and the road-vehicle communication system including a transmission frequency adjustment unit configured to adjust a frequency at which the data transmission unit transmits data to the in-vehicle communication apparatus, based on vehicle information received by the vehicle information reception unit.

Also, in the road-vehicle communication system according to the present invention, the roadside communication apparatus has the combined number adjustment unit.

Also, in the road-vehicle communication system according to the present invention, the roadside communication apparatus has the transmission frequency adjustment unit.

Also, the road-vehicle communication system according to the present invention further includes a server apparatus configured to deliver a plurality of pieces of data to be transmitted to the in-vehicle communication apparatus to the roadside communication apparatus, and the server apparatus has the combined number adjustment unit.

Also, in the road-vehicle communication system according to the present invention, the server apparatus delivers data to a plurality of the in-vehicle communication apparatus, and the combined number adjustment unit adjusts the combined number according to information related to the roadside communication apparatus.

Also, the road-vehicle communication system according to the present invention further includes a server apparatus configured to deliver a plurality of pieces of data to be transmitted to the in-vehicle communication apparatus to the roadside communication apparatus, and the server apparatus has the transmission frequency adjustment unit.

Also, in the road-vehicle communication system according to the present invention, the server apparatus delivers data to a plurality of the in-vehicle communication apparatus, and the transmission frequency adjustment unit adjusts the transmission frequency according to information related to the roadside communication apparatus.

Also, a roadside communication apparatus according to the present invention is configured to be installed on a road and to communicate with an in-vehicle communication apparatus mounted in a vehicle, the roadside communication apparatus including a storage unit configured to store a plurality of pieces of data to be transmitted to the in-vehicle communication apparatus, a vehicle information reception unit configured to receive vehicle information transmitted from the in-vehicle communication apparatus, a transmission data generation unit configured to combine a plurality of pieces of data stored in the storage unit to generate a single piece of transmission data, a data transmission unit configured to transmit the data generated by the transmission data generation unit to the in-vehicle communication apparatus, and a combined number adjustment unit configured to adjust the number of pieces of data to be combined by the transmission data generation unit, based on vehicle information received by the vehicle information reception unit.

Also, the roadside communication apparatus according to the present invention includes a transmission frequency adjustment unit configured to adjust a frequency at which the data transmission unit transmits data to the in-vehicle communication apparatus, based on vehicle information received by the vehicle information reception unit.

Also, an in-vehicle communication apparatus according to the present invention is configured to be mounted in a vehicle and to communicate with a roadside communication apparatus installed on a road, the in-vehicle communication apparatus including a vehicle information transmission unit configured to transmit vehicle information related to the vehicle to the roadside communication apparatus, and the vehicle information transmission unit transmitting speed information of the vehicle, position information on the vehicle, and/or information related to a necessity of data that is transmitted by the roadside communication apparatus.

Also, a road-vehicle communication method according to the present invention is for transmitting predetermined data from a roadside communication apparatus installed on a road to an in-vehicle communication apparatus mounted in a vehicle, the method including the in-vehicle communication apparatus transmitting vehicle information related to the vehicle, the roadside communication apparatus storing a plurality of pieces of data to be transmitted to the in-vehicle communication apparatus, the roadside communication apparatus combining a plurality of pieces of stored data to generate a single piece of transmission data, and transmitting the generated data to the in-vehicle communication apparatus, and the roadside communication apparatus, at a time of generating the transmission data, adjusting the number of pieces of data to be combined based on vehicle information received from the in-vehicle communication apparatus.

Also, the road-vehicle communication method according to the present invention includes the roadside communication apparatus, at a time of transmitting the transmission data to the in-vehicle communication apparatus, adjusting a frequency at which data is transmitted to the in-vehicle communication apparatus based on vehicle information received from the in-vehicle communication apparatus.

In the present invention, an in-vehicle communication apparatus mounted in a vehicle transmits vehicle information related to the vehicle to a roadside communication apparatus installed on a road. The roadside communication apparatus stores a plurality of pieces of data to be transmitted to the in-vehicle communication apparatus, combines a plurality of pieces of stored data to generate transmission data, and transmits the generated transmission data to the in-vehicle communication apparatus. At this time, the roadside communication apparatus adjusts the number of pieces of data to be combined as transmission data, based on vehicle information received from the in-vehicle communication apparatus. In the case where the number of pieces of data to be combined is large, it is possible to transmit a large amount of data at one time, but since the data length of the transmission data increases, there is an increased possibility of transmission failure during transmission. In the case where the number of pieces of certificate information to be combined is small, transmission failure tends not to occur since transmission can be completed in a short time, but the number of pieces of certificate information that can be transmitted at one time decreases and the frequency at which transmission is performed increases.

With the road-vehicle communication system according to the present invention having the above configuration, it becomes possible for the roadside communication apparatus to, for example, judge whether wireless communication with the in-vehicle communication apparatus can be stably performed, based on vehicle information received from the in-vehicle communication apparatus, and adjust the number of pieces of data to be combined as transmission data based on the judgment result.

Also, in the present invention, the travelling speed of the vehicle (vehicle speed) is transmitted as vehicle information from the in-vehicle communication apparatus to the roadside communication apparatus. In the case where the vehicle speed is high, there is a possibility of not being able to stably perform wireless communication between the roadside communication apparatus and the in-vehicle communication apparatus. In view of this, the roadside communication apparatus adjusts the number of pieces of data to be combined, so as to increase the number of pieces of data to be combined for a slower vehicle speed and to reduce the number of pieces of data to be combined for a faster vehicle speed. The occurrence of problems such as data transmission from the roadside communication apparatus to the in-vehicle communication apparatus failing during transmission can thereby be suppressed.

Also, in the present invention, when the roadside communication apparatus performs data transmission to the in-vehicle communication apparatus, the frequency of data transmission is adjusted, based on vehicle information received from the in-vehicle communication apparatus. Increasing the communication frequency to one in-vehicle communication apparatus enables retransmission to be quickly performed even if data transmission fails, although there is a possibility of issues arising in data transmission to other in-vehicle communication apparatuses due to the increased amount of communication. Reducing the communication frequency to in-vehicle communication apparatuses enables an increase in the amount of communication to be suppressed, but it takes time to perform retransmission in the case where data transmission fails.

With the road-vehicle communication system according to the present invention having the above configuration, it becomes possible for the roadside communication apparatus to, for example, judge whether wireless communication with the in-vehicle communication apparatus can be stably performed, based on vehicle information received from the in-vehicle communication apparatus, and adjust the transmission frequency of data based on the judgment result.

Also, in the present invention, position information of the vehicle is transmitted as vehicle information from the in-vehicle communication apparatus to the roadside communication apparatus. In the case where the vehicle is located at a distance from the roadside communication apparatus, there is a possibility of the vehicle travelling out of communication range with the roadside communication apparatus. In view of this, the roadside communication apparatus adjusts the transmission frequency, so as to increase the transmission frequency for a longer distance to the vehicle and to reduce the transmission frequency for a shorter distance. The occurrence of a state in which the roadside communication apparatus becomes unable to communicate with the in-vehicle communication apparatus before transmission of data to be transmitted to the in-vehicle communication apparatus is all completed can thereby be suppressed.

Also, in the present invention, information related to the necessity of data that is transmitted by the roadside communication apparatus is transmitted from the in-vehicle communication apparatus to the roadside communication apparatus. For example, in the case where, in a system that transmits digital certificate information from the roadside communication apparatus to the in-vehicle communication apparatus, the digital certificate has a period of validity and there is still sufficient time remaining until the period of validity of the digital certificate that is held by the in-vehicle communication apparatus expires, the necessity for transmitting digital certificate information from the roadside communication apparatus to the in-vehicle communication apparatus is low. As a result of the in-vehicle communication apparatus itself judging the necessity for data transmission and informing the roadside communication apparatus, and the roadside communication apparatus adjusting the combined number and transmission frequency of data in response, the roadside communication apparatus is able to transmit data to in-vehicle communication apparatuses that need the data more.

Also, in the present invention, a configuration may be adopted in which the abovementioned adjustment of the combined number of data and adjustment of transmission frequency of data are performed by the roadside communication apparatus, or are performed by a server apparatus that is not a roadside communication apparatus. A server apparatus that generates data such as digital certificate information and delivers the generated data to the roadside communication apparatus can be employed as the server apparatus that performs the adjustment processing.

Also, in the present invention, with a configuration in which a server apparatus performs the adjustment processing, the server apparatus performs adjustment of the combined number of data and/or adjustment of the transmission frequency of data with consideration for vehicle information related to the vehicle serving as the data transmission destination and information related to the roadside communication apparatus serving as the data transmission source. For example, depending on the surrounding environment of the road on which the roadside communication apparatus is installed, there is a possibility of differences arising in areas such as the coverage of wireless signals transmitted from roadside communication apparatuses or the signal strength of the wireless signals. In view of this, a configuration can be adopted in which an indicator such as the ease of performing wireless communication with the in-vehicle communication apparatus is investigated and indexed in advance for every roadside communication apparatus, and stored in the server apparatus, and the server apparatus performs adjustment of the combined number of data and/or adjustment of the transmission frequency of data according to this index. Alternatively, a configuration can be adopted in which the server apparatus aggregates the success rate, failure rate or the like of data transmission performed between the roadside communication apparatus and the in-vehicle communication apparatus, and the server apparatus performs adjustment of the combined number of data and/or adjustment of the transmission frequency of data according to the success rate, failure rate or the like for every roadside communication apparatus. As a result of these configurations, data transmission to the in-vehicle communication apparatus can be performed with a combined number of data and a transmission frequency of data that are more suitable for the roadside communication apparatus.

Advantageous Effects of Invention

In the case of the present invention, by adopting a configuration in which the number of pieces of data to be combined as transmission data to the in-vehicle communication apparatus and/or the frequency at which data transmission is performed to the in-vehicle communication apparatus are adjusted, based on vehicle information received from the in-vehicle communication apparatus, it can be expected to perform data transmission from the roadside communication apparatus to the in-vehicle communication apparatus more reliably, and to suppress an increase of the amount of communication between the roadside communication apparatus and the in-vehicle communication apparatus.

BRIEF DESCRIPTION OF DRAWINGS

FIG. 5 is a schematic diagram for describing an example of the adjustment of combined number and transmission frequency by the roadside communication apparatus.

FIG. 6 is a schematic diagram for describing an example of the adjustment of combined number and transmission frequency by the roadside communication apparatus.

FIG. 12 is a schematic diagram for describing adjustment processing that depends on the communication capability of the roadside communication apparatus and is performed by the certificate issuing server apparatus according to the second embodiment.

DETAILED DESCRIPTION OF PREFERRED EMBODIMENTS

First Embodiment

Figure 1:
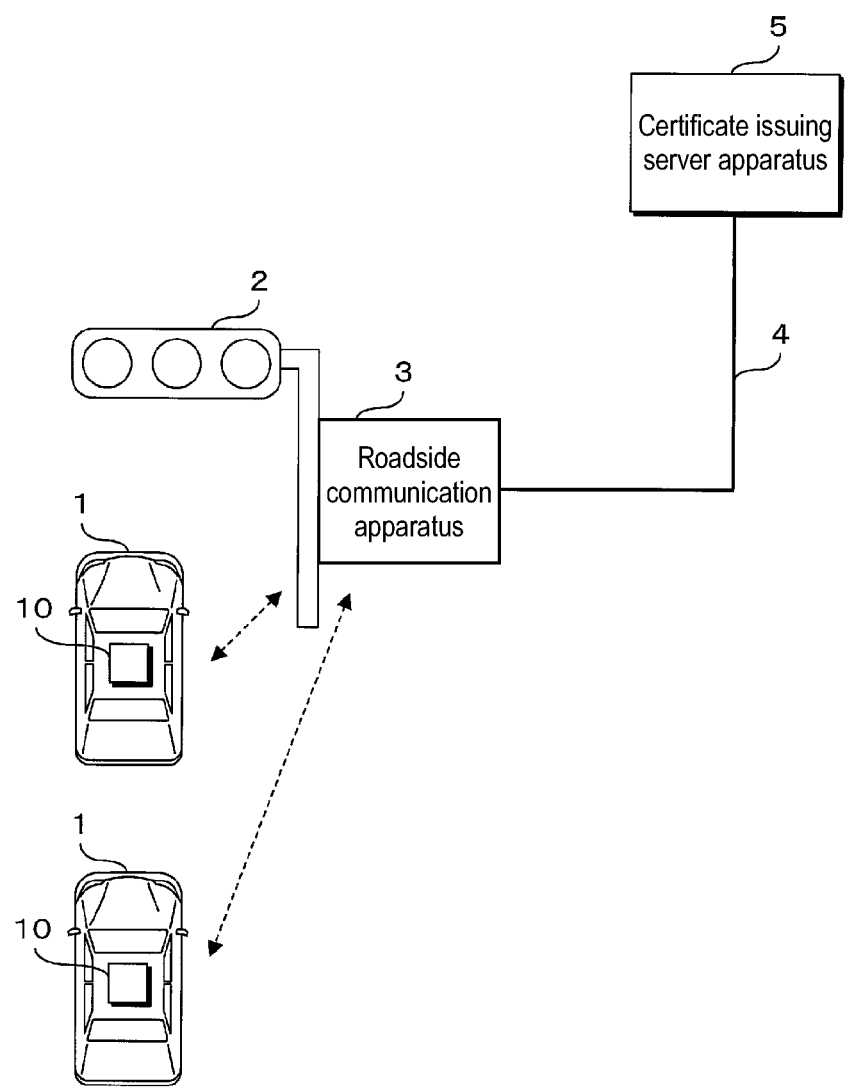
FIG. 1 is a schematic diagram showing the configuration of a road-vehicle communication system according to the present embodiment.

FIG. 1 is a schematic diagram showing the configuration of a road-vehicle communication system according to the present embodiment. The road-vehicle communication system according to the present embodiment is a system in which an in-vehicle communication apparatus 10 mounted in a vehicle 1 performs wireless communication, so-called V2I (Vehicle-to-Infrastructure) communication or road-vehicle communication, with a roadside communication apparatus 3 installed in a traffic light 2 on a road. The roadside communication apparatus 3 simultaneously transmits (broadcasts) information such as the current color of the traffic light 2 and the time remaining until the traffic light 2 changes to the next color to one or a plurality of vehicles 1 that are located in the surrounding area. A vehicle 1 that receives information from the roadside communication apparatus 3 with the in-vehicle communication apparatus 10 is able to perform processing such as message display alerting the user or control for automatically reducing the vehicle speed, for example.

Also, the roadside communication apparatus 3 can perform communication with other apparatuses, via a network 4 such as the Internet. The in-vehicle communication apparatus 10 of the vehicle 1 is thereby able to communicate with other apparatuses installed outside the vehicle 1 via the roadside communication apparatus 3. In the present embodiment, the roadside communication apparatus 3 is able to perform communication with a certificate issuing server apparatus 5 via the network 4.

The in-vehicle communication apparatus 10 according to the present embodiment, in the case of transmitting data to another apparatus by road-vehicle communication, transmits transmission data with an electronic signature attached thereto, in order to prevent spoofing, data tampering and the like by a malicious third party. The apparatus that receives the data determines the validity of the received data, based on the electronic signature attached to the received data. For example, the communication system according to the present embodiment performs communication utilizing so-called public-key encryption technology. The in-vehicle communication apparatus 10 thus has a private key for encrypting data to be transmitted or a hash value of this data and a public key for decrypting encrypted data. The in-vehicle communication apparatus 10 transmits transmission data to another apparatus after attaching an electronic signature that includes encrypted data encrypted using the private key, the public key for decrypting this encrypted data and certificate information certifying that this public key is valid.

The certificate issuing server apparatus 5 is an apparatus that issues certificate information that is used when the in-vehicle communication apparatus 10 communicates with other apparatuses. The in-vehicle communication apparatus 10 stores the certificate information issued by the certificate issuing server apparatus 5, and uses the stored certificate information whenever data transmission is performed. A period of validity is, however, set in the certificate information that is issued by the certificate issuing server apparatus 5, and the in-vehicle communication apparatus 10 needs to request the certificate issuing server apparatus 5 to issue certificate information and acquire new certificate information, before this period of validity expires or after it has expired. In the communication system according to the present embodiment, making a request for issuance of certificate information from the in-vehicle communication apparatus 10 to the certificate issuing server apparatus 5 and transmission of certificate information from the certificate issuing server apparatus 5 to the in-vehicle communication apparatus 10 can be performed via the roadside communication apparatus 3.

Figure 2:
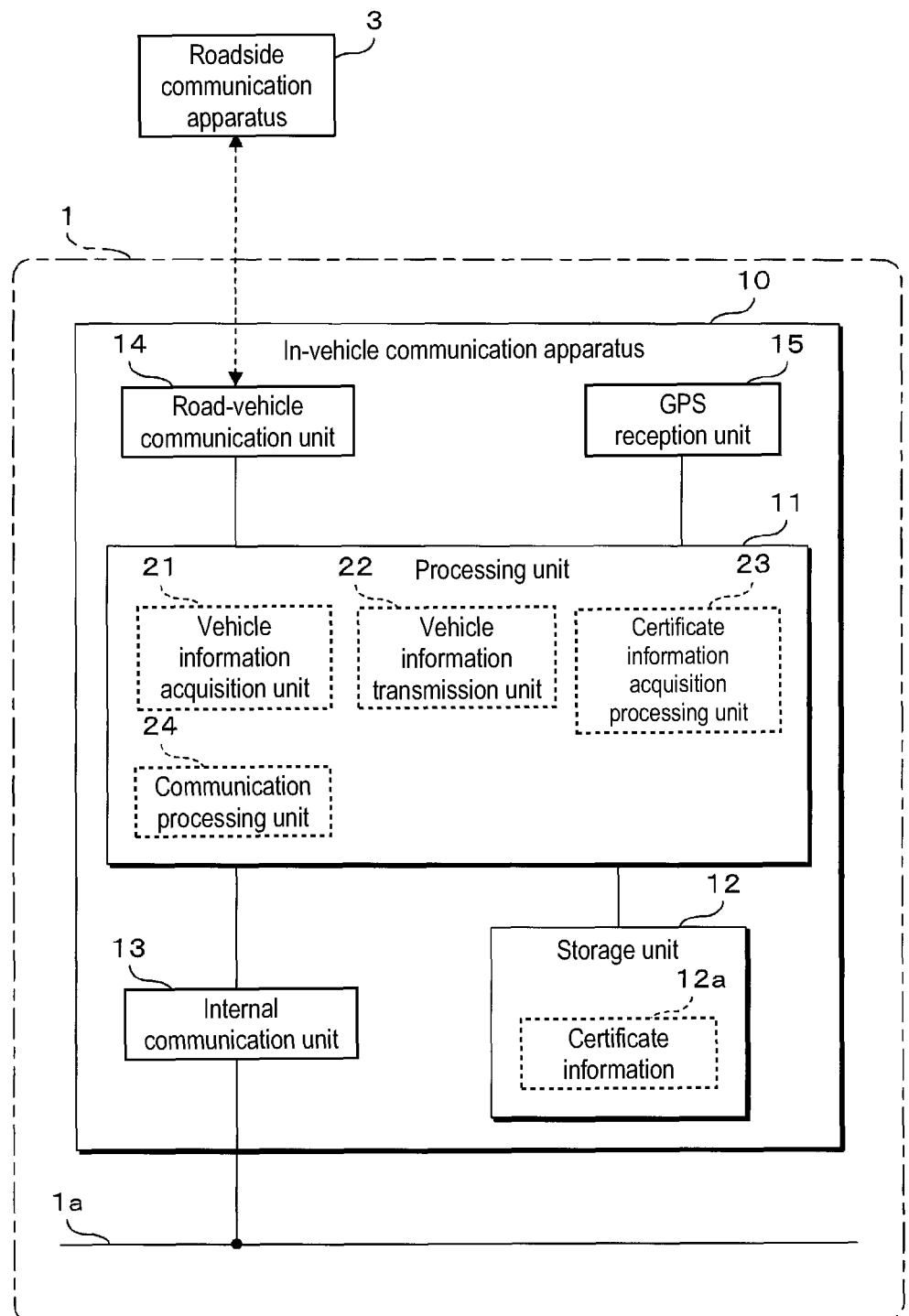
FIG. 2 is a block diagram showing the configuration of an in-vehicle communication apparatus.

FIG. 2 is a block diagram showing the configuration of the in-vehicle communication apparatus 10. The in-vehicle communication apparatus 10 that is mounted in the vehicle 1 is constituted to be provided with a processing unit 11, a storage unit 12, an internal communication unit 13, a road-vehicle communication unit 14, a GPS (Global Positioning System) reception unit 15, and the like. The processing unit 11 is constituted using a computational processor such as a CPU (Central Processing Unit) or an MPU (Micro-Processing Unit), and performs various types of computational processing related to communication, by reading out and executing programs stored in the storage unit 12, a ROM (Read-Only Memory) which is not illustrated, or the like.

The storage unit 12 is constituted using a nonvolatile memory device such as an EEPROM (Electrically Erasable Programmable Read-Only Memory) or a flash memory, for example. The storage unit 12 stores programs that are executed by the processing unit 11 and various types of data that are used in processing by the processing unit 11, for example. In the present embodiment, the storage unit 12 stores certificate information 12a that is used in communication with other apparatuses. The certificate information 12a is certificate information issued by the certificate issuing server apparatus 5, and is information certifying the validity of the public key held by the in-vehicle communication apparatus 10.

The internal communication unit 13 communicates with other in-vehicle devices mounted in the vehicle 1 (e.g., body ECU (Electronic Control Unit), car navigation apparatus, etc.), via an internal network 1a such as a CAN (Controller Area Network) provided within the vehicle 1. The internal communication unit 13 performs data transmission by converting data for transmission provided by the processing unit 11 into an electrical signal and outputting the electrical signal to a communication line constituting the internal network 1a, and also receives data by acquiring a potential of the communication line through sampling and provides the received data to the processing unit 11.

The road-vehicle communication unit 14 wirelessly communicates with the roadside communication apparatus 3 provided on the road. The road-vehicle communication unit 14 performs data transmission to the roadside communication apparatus 3 by outputting signals obtained through modulating data for transmission provided by the processing unit 11 from an antenna, and also receives data from the roadside communication apparatus 3 by demodulating signals received with the antenna and provides the received data to the processing unit 11. Note that an electronic signature generated using the certificate information 12a stored in the storage unit 12 is attached to data that is transmitted by the road-vehicle communication unit 14.

The GPS reception unit 15 receives wireless signals that are transmitted by GPS satellites, and provides information included in the received signals to the processing unit 11. The processing unit 11 is able to perform processing for calculating the position (latitude and longitude, etc.) of the vehicle 1, based on the information provided from the GPS reception unit 15.

Also, a vehicle information acquisition unit 21, a vehicle information transmission unit 22, a certificate information acquisition processing unit 23, a communication processing unit 24 and the like are realized as a software-based functional blocks in the processing unit 11 of the in-vehicle communication apparatus 10 according to the present embodiment, by executing programs stored in the storage unit 12, the ROM, or the like. The vehicle information acquisition unit 21 performs processing for acquiring predetermined vehicle information to be transmitted to the roadside communication apparatus 3, based on information that is obtained via communication within the vehicle 1 by the internal communication unit 13 and information that is obtained from the GPS reception unit 15. In the present embodiment, the vehicle information acquisition unit 21 acquires information on the speed of the vehicle 1 by internal communication, and acquires information on the position of the vehicle 1 based on information from the GPS reception unit 15.

The vehicle information transmission unit 22 performs processing for transmitting the vehicle information acquired by the vehicle information acquisition unit 21 to the roadside communication apparatus 3 with the road-vehicle communication unit 14. Acquisition of vehicle information by the vehicle information acquisition unit 21 and transmission of vehicle information by the vehicle information transmission unit 22 are performed in a predetermined cycle such as every second or every minute, for example. Also, transmission of vehicle information by the vehicle information transmission unit 22 is repeatedly performed in the predetermined cycle, regardless of whether the roadside communication apparatus 3 is located within the coverage of wireless signals that are transmitted by the road-vehicle communication unit 14.

The communication processing unit 24 communicates with other apparatuses within the vehicle 1 using the internal communication unit 13, and communicates with (other apparatuses outside the vehicle via) the roadside communication apparatus 3 using the road-vehicle communication unit 14. The communication processing unit 24, in the case of performing data transmission to another apparatus, generates an electronic signature on the basis of the certificate information 12a stored in the storage unit 12, and attaches the electronic signature to data that is to be transmitted. Also, the communication processing unit 24, in the case where data from another apparatus is received, performs processing for determining the validity of the electronic signature included in the received data.

Figure 3:
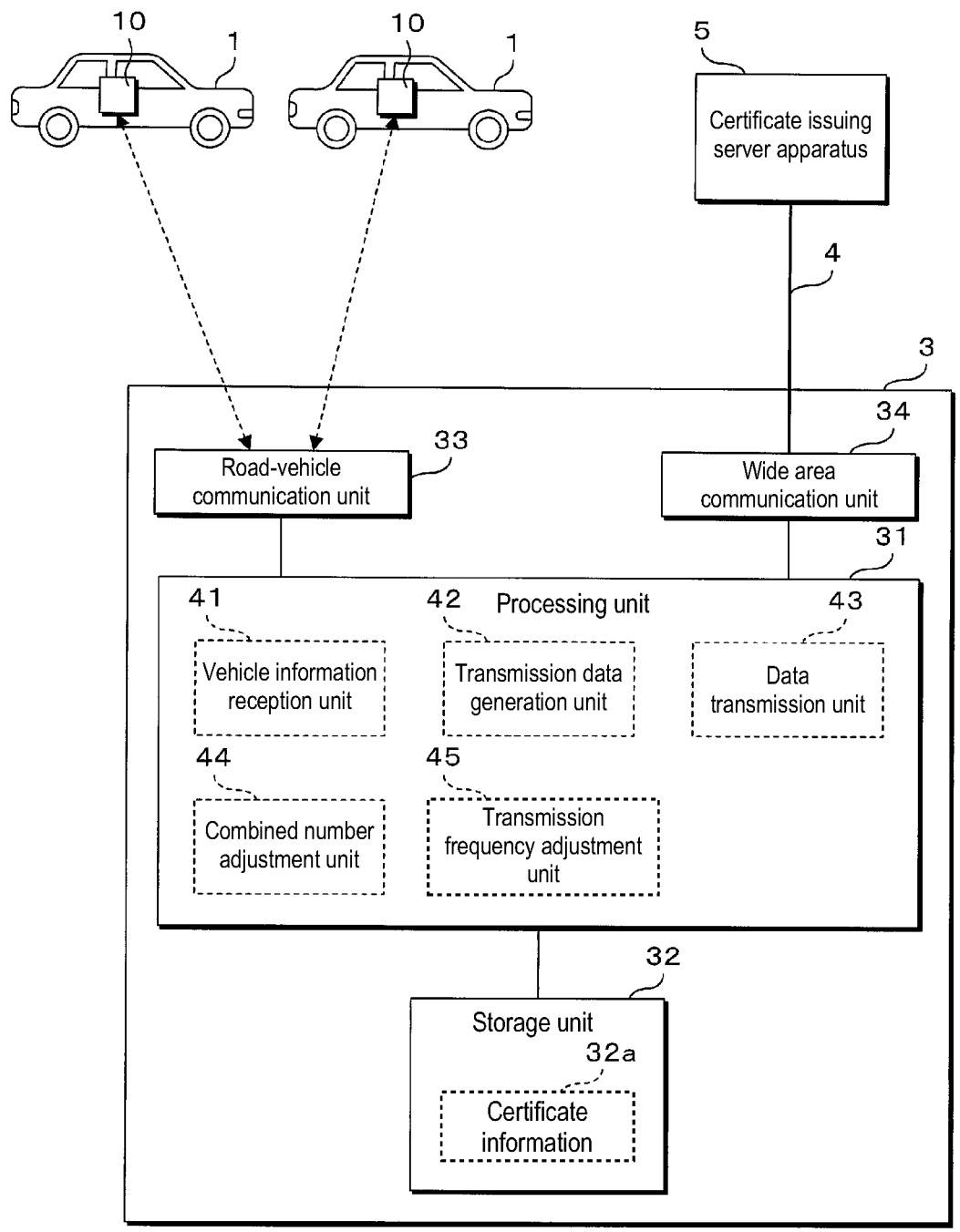
FIG. 3 is a block diagram showing the configuration of a roadside communication apparatus.

FIG. 3 is a block diagram showing the configuration of the roadside communication apparatus 3. The roadside communication apparatus 3 according to the present embodiment is constituted to be provided with a processing unit 31, a storage unit 32, a road-vehicle communication unit 33, a wide area communication unit 34, and the like. The processing unit 31 is constituted using a computational processor such as a CPU, and performs various types of computational processing related to communication. For example, the processing unit 31 performs processing for acquiring information relating to the lighting state of the traffic light 2, processing for acquiring traffic congestion information for roads around the traffic light 2, and processing for simultaneously transmitting acquired information to the vehicles 1. Also, the roadside communication apparatus 3 according to the present embodiment performs processing for transmitting certificate information issued by the certificate issuing server apparatus 5 to a specific vehicle 1.

The storage unit 32 is constituted using a storage device such as a DRAM (Dynamic Random Access Memory), a flash memory or a hard disk, for example. The storage unit 32 temporarily stores data that is transmitted and received by the roadside communication apparatus 3, such as data received from the vehicle 1 with the road-vehicle communication unit 33 and data received with the wide area communication unit 34 via the network 4. The roadside communication apparatus 3 according to the present embodiment temporarily stores certificate information 32*a* received by the wide area communication unit 34 from the certificate issuing server apparatus 5 in the storage unit 32, reads out the certificate information 32*a* from the storage unit 32, and transmits the certificate information 32*a* to the vehicle 1.

The road-vehicle communication unit 33 wirelessly communicates with the in-vehicle communication apparatus 10 mounted in the vehicle 1. The road-vehicle communication unit 33 performs data transmission to the in-vehicle communication apparatus 10 by outputting signals obtained through modulating data for transmission provided by the processing unit 31 from an antenna, and also receives data from the in-vehicle communication apparatus 10 by demodulating signals received with the antenna and provides the received data to the processing unit 31. Note that an electronic signature has been attached by each vehicle 1 to the data received by the road-vehicle communication unit 33 from the vehicles 1. The roadside communication apparatus 3 that receives data determines the validity of the electronic signature included in the received data. Note that the roadside communication apparatus 3 may also attach an electronic signature to data transmitted by the roadside communication apparatus 3 to the in-vehicle communication apparatus 10.

The wide area communication unit 34 communicates with a server apparatus that is administered by a traffic management center, for example, the certificate issuing server apparatus 5 described above, or the like, via a network 4 such as the Internet. The wide area communication unit 34 transmits data for transmission provided by the processing unit 31 to the server apparatus or the like connected to the network 4, and also receives data from the server apparatus or the like and provides the received data to the processing unit 31.

Also, the functional blocks of a vehicle information reception unit 41, a transmission data generation unit 42, a data transmission unit 43, a combined number adjustment unit 44, a transmission frequency adjustment unit 45 and the like are provided in the processing unit 31 of the roadside communication apparatus 3 according to the present embodiment. The vehicle information reception unit 41 performs processing for receiving vehicle information such as vehicle speed and position that is transmitted by the in-vehicle communication apparatus 10 of the vehicle 1 with the road-vehicle communication unit 33, and storing the received vehicle information in the storage unit 32. Note that since there is a possibility of one roadside communication apparatus 3 receiving vehicle information from a plurality of vehicles 1, the vehicle information reception unit 41 stores received vehicle information in the storage unit 32 in association with a vehicle ID given to the vehicle 1 that transmitted the vehicle information, for example. Also, the vehicle information reception unit 41, in the case where new vehicle information is received from a vehicle 1 whose vehicle information was previously stored in the storage unit 32, updates the vehicle information to the latest information, by overwriting the vehicle information stored in the storage unit 32. Note that vehicle information stored in the storage unit 32 may be deleted if not updated within a predetermined time period.

The transmission data generation unit 42 performs processing for combining one or a plurality of pieces of certificate information 32*a* stored in the storage unit 32 to generate a single piece of transmission data. The certificate issuing server apparatus 5 does not necessarily issue only one piece of certificate information for one vehicle 1 at one time. In the case where the certificate issuing server apparatus 5 issues a plurality of pieces of certificate information for one vehicle 1 at one time, the plurality of pieces of certificate information are delivered from the certificate issuing server apparatus 5 to the roadside communication apparatus 3, and the plurality of pieces of certificate information 32*a* are stored for the one vehicle 1 in the storage unit 32 of the roadside communication apparatus 3 that receives the certificate information. The transmission data generation unit 42 selects and reads out one or a plurality of pieces of certificate information 32*a* from among the plurality of pieces of certificate information 32*a* issued for the vehicle 1 to which data is to be transmitted, combines the certificate information 32*a* that is read out, and further attaches information such as a header, footer and the like to obtain transmission data. The header, footer and the like that are attached to the transmission data can include information such as an ID of the vehicle 1 designating the transmission destination, the data length of the transmission data, and the number of pieces of certificate information 32*a* that are included in the transmission data, and/or an electronic signature indicating that the transmission data is valid, for example.

The data transmission unit 43 performs processing for transmitting the transmission data generated by the transmission data generation unit 42 to the in-vehicle communication apparatus 10 of the vehicle 1 to which data is to be transmitted with the road-vehicle communication unit 33. In the present embodiment, in the case where transmission of transmission data by the data transmission unit 43 is performed from the roadside communication apparatus 3 to a predetermined vehicle 1, the in-vehicle communication apparatus 10 of the vehicle 1 that receives this data sends a response indicating that reception was completed normally to the roadside communication apparatus 3. The data transmission unit 43 of the roadside communication apparatus 3, in the case where a reception completed response from the in-vehicle communication apparatus 10 is not obtained, judges that data transmission failed and retransmits the transmission data. Also, in the case where all of the certificate information 32*a* issued for one vehicle cannot be transmitted with one data transmission, the transmission data generation unit 42 generates a plurality of pieces of transmission data, and the data transmission unit 43 transmits the plurality of pieces of transmission data in order. Retransmission of transmission data and sequential transmission of a plurality of pieces of transmission data by the data transmission unit 43 are performed at a predetermined frequency (cycle) that is determined for every vehicle 1.

The combined number adjustment unit 44 performs processing for adjusting how many pieces of certificate information 32*a* are combined by the transmission data generation unit 42 to generate a single piece of transmission data, that is, processing for adjusting the combined number of certificate information 32*a* to be combined as transmission data. The combined number adjustment unit 44 reads out the vehicle information of each vehicle 1 stored in the storage unit 32, determines the combined number for every vehicle 1 according to the vehicle information that is read out, and notifies the combined number that is determined to the transmission data generation unit 42. The transmission data generation unit 42 reads out pieces of certificate information 32*a* of the combined number determined by the combined number adjustment unit 44 from the storage unit 32, and combines the pieces of certificate information 32a that are read out to generate transmission data.

The transmission frequency adjustment unit 45 performs processing for adjusting the frequency at which retransmission of transmission data and sequential transmission of a plurality of pieces of transmission data by the data transmission unit 43 are performed. The transmission frequency adjustment unit 45 reads out the vehicle information of each vehicle 1 stored in the storage unit 32, determines the transmission frequency for every vehicle 1 according to the vehicle information that is read out, and notifies the determined transmission frequency to the data transmission unit 43. The data transmission unit 43 repeatedly performs retransmission of transmission data and sequential transmission of a plurality of pieces of transmission data at the transmission frequency determined by the transmission frequency adjustment unit 45.

Figure 4:
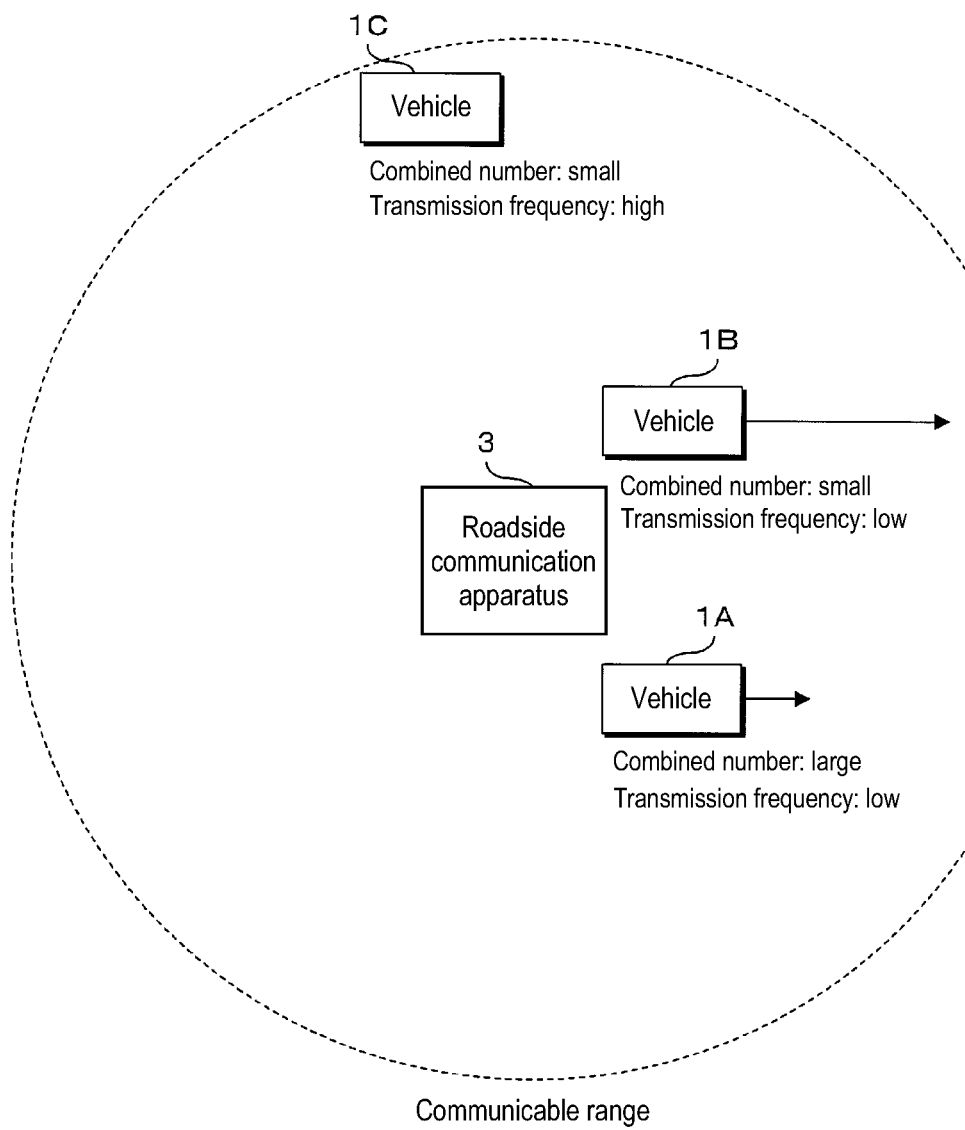
FIG. 4 is a schematic diagram for describing an example of the adjustment of combined number and transmission frequency by the roadside communication apparatus.

FIGS. 4 to 6 are schematic diagrams for describing an example of adjustment of the combined number and the transmission frequency by the roadside communication apparatus 3. In FIG. 4, the range over which it is possible for the roadside communication apparatus 3 to perform wireless communication is shown with a dashed circle centered on the roadside communication apparatus 3. In the present example, three vehicles 1 are located within the communicable range of the roadside communication apparatus 3, with the reference numerals 1A to 1C being given in order to distinguish these vehicles. Also, with regard to the vehicles 1A and 1B, arrows (vectors) indicating the travel direction and vehicle speed are given. The direction of the arrows is the travel direction, and the length of the arrows indicates the vehicle speed. Also, a numerical example in the case of adjusting the combined number in ten steps is shown as a table in FIG. 5, and a numerical example in the case of adjusting the transmission frequency in five steps is shown as a table in FIG. 6.

In the present embodiment, the combined number adjustment unit 44 of the roadside communication apparatus 3 adjusts the combined number of certificate information 32a according to the speed of the vehicle 1. The combined number adjustment unit 44 increases the combined number for the slower speed of the vehicle 1A, and decreases the combined number for the faster speed of the vehicle 1B. In the case where a maximum of ten pieces of certificate information 32a can be combined as transmission data, for example, the combined number adjustment unit 44 sets the combined number for a vehicle 1 travelling at 0 to 10 km/h to 10, sets the combined number for a vehicle 1 travelling at 10 to 20 km/h to 9, . . . , and sets the combined number for a vehicle 1 travelling at over 90 km/h to 1. The roadside communication apparatus 3 is thereby able to combine and transmit a large number of pieces of certificate information at one time when the vehicle 1 is travelling at a slow speed at which wireless communication with the in-vehicle communication apparatus 10 can be stably performed, and to perform reliable data transmission by reducing the size of transmission data when the vehicle 1 is travelling at a fast speed at which wireless communication with the in-vehicle communication apparatus 10 cannot be stably performed.

Note that the combined number adjustment unit 44 reduces the combined number (e.g., to 1) for the vehicle 1C that is a predetermined distance or more away from the roadside communication apparatus 3, regardless of the vehicle speed. The predetermined distance at this time can be set to a distance such as 90 m or more, in the case where the communicable range of the roadside communication apparatus 3 is 100 m, for example. In the case where the vehicle 1 could travel outside the communicable range of the roadside communication apparatus 3 and there is a possibility of not being able to stably perform wireless communication, data transmission can thereby be reliably performed by reducing the size of the transmission data.

The transmission frequency adjustment unit 45 adjusts the frequency at which data transmission is performed according to the distance from the roadside communication apparatus 3 to the vehicle 1. The transmission frequency adjustment unit 45 calculates the distance from the roadside communication apparatus 3 to the vehicle 1, based on the position of each vehicle 1 obtained as vehicle information and the position in which the roadside communication apparatus 3 is installed. For example, the transmission frequency adjustment unit 45 sets the frequency (transmission cycle) of data transmission to 1000 ms if the distance to the vehicle is 0 to 20 m, sets the transmission cycle to 500 ms if the distance is 20 to 40 m, . . . , and sets the transmission cycle to 10 ms if the distance exceeds 80 m. The roadside communication apparatus 3 is thereby able to perform reliable data transmission by increasing the transmission frequency for vehicles that are highly likely to travel outside the communicable range.

Figure 7:
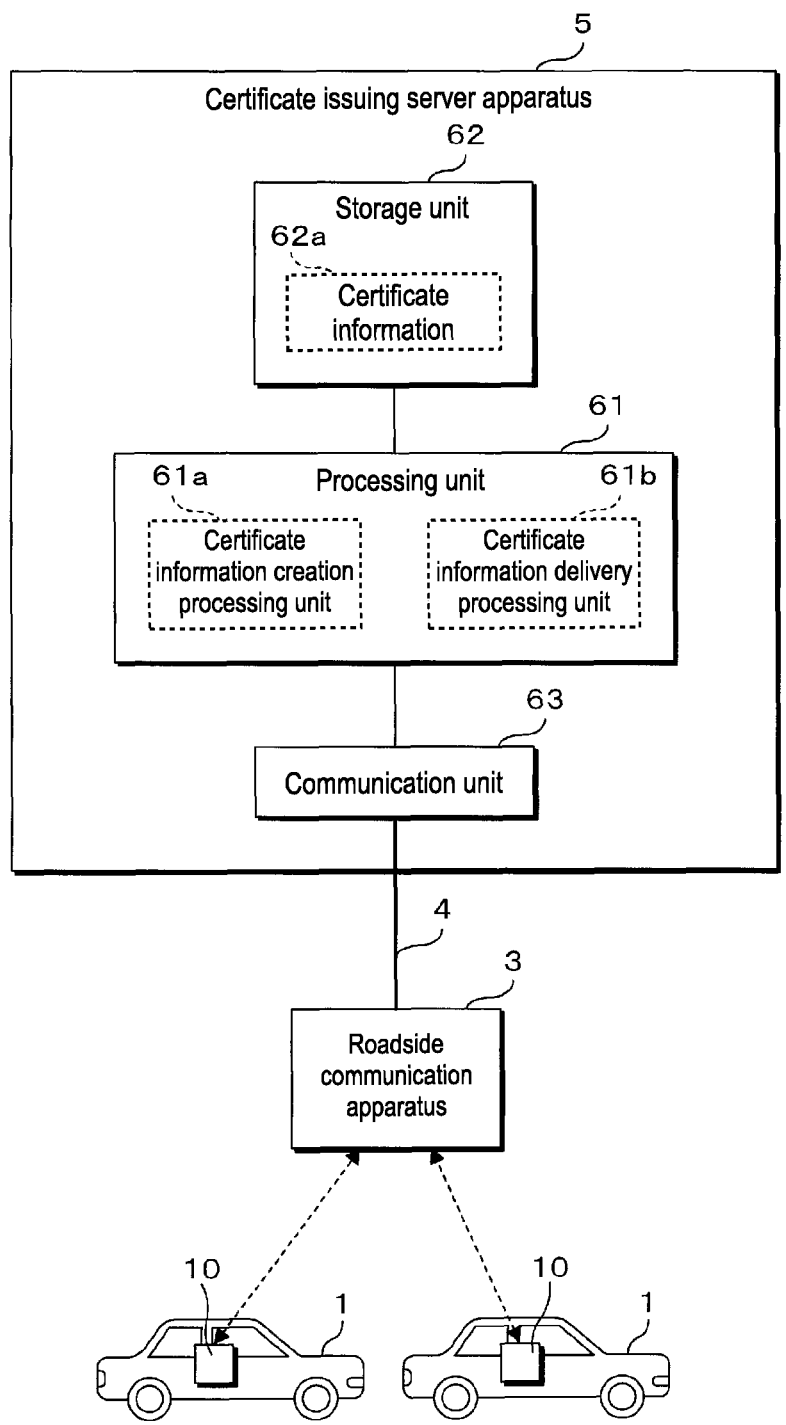
FIG. 7 is a block diagram showing the configuration of a certificate issuing server apparatus.

FIG. 7 is a block diagram showing the configuration of the certificate issuing server apparatus 5. The certificate issuing server apparatus 5 according to the present embodiment is constituted to be provided with a processing unit 61, a storage unit 62, a communication unit 63, and the like. The processing unit 61 is constituted using a computational processor such as a CPU, and performs various types of computational processing related to creation of certificate information, by executing programs stored in the storage unit 62. The storage unit 62 is constituted using a storage device such as a hard disk, for example, and stores programs that are executed by the processing unit 61 and various types of data required in processing by the processing unit 61. In the present embodiment, the storage unit 62 stores created certificate information 62a to be transmitted to the vehicles 1. The communication unit 63 communicates with the roadside communication apparatus 3, via a network 4 such as the Internet. The communication unit 63 transmits data for transmission provided by the processing unit 61 to the roadside communication apparatus 3 connected to the network 4, and also receives data from the roadside communication apparatus 3 and provides the received data to the processing unit 61.

Also, a certificate information creation processing unit 61a, a certificate information delivery processing unit 61b and the like are realized as software-based functional blocks in the processing unit 61 of the certificate issuing server apparatus 5 according to the present embodiment, by executing programs stored in the storage unit 62. The certificate information creation processing unit 61a performs processing for creating certificate information, in response to a request from the in-vehicle communication apparatus 10. The certificate information creation processing unit 61a creates certificate information of the in-vehicle communication apparatus 10, based on information such as the public key that is provided from the in-vehicle communication apparatus 10 together with the request, and stores the created certificate information in the storage unit 62. The certificate information delivery processing unit 61b performs processing for reading out the certificate information 62a created by the certificate information creation processing unit 61a from the storage unit 62, and transmitting the certificate information 62a that is read out to the roadside communication apparatus 3 that is able communicate wirelessly with the vehicle 1 that requires this certificate information 62*a*.

Note that, in the present embodiment, processing such as requesting issuance of certificate information and delivering issued certificate information that is performed between the in-vehicle communication apparatus 10 of the vehicle 1 and the certificate issuing server apparatus 5 may be carried out in any manner, and a detailed description thereof is omitted. In the present embodiment, one or a plurality of pieces of certificate information issued by the certificate issuing server apparatus 5 need only be delivered to a roadside communication apparatus 3 that is wirelessly communicable with the vehicle 1 that requires the certificate information. Processing such as requesting issuance of certificate information and delivering issued certificate information can, however, be performed with procedures that are briefly described below, for example.

For example, the in-vehicle communication apparatus 10 mounted in the vehicle 1, in the case where the period of validity of certificate information held thereby is close to expiring, transmits a wireless signal targeted to roadside communication apparatuses 3 at a predetermined cycle, and determines whether there is a communicable roadside communication apparatus 3 according to whether or not a response is received. In the case where there is a communicable roadside communication apparatus 3, the in-vehicle communication apparatus 10 requests the certificate issuing server apparatus 5 to issue certificate information via this roadside communication apparatus 3. The certificate issuing server apparatus 5 that receives the request creates certificate information, but since the certificate issuing server apparatus 5 receives requests for issuance of certificate information from a large number of vehicles 1, it takes anywhere from several minutes to several hours, for example, to complete creation of certificate information after receiving a request.

The in-vehicle communication apparatus 10 of the vehicle 1 that requested issuance of certificate information thereafter also transmits the wireless signal targeted to roadside communication apparatuses 3 at the predetermined cycle, and determines whether there is a communicable roadside communication apparatus 3 according to whether or not a response is received. In the case where there is a communicable roadside communication apparatus 3, the in-vehicle communication apparatus 10 makes an inquiry to the certificate issuing server apparatus 5 via this roadside communication apparatus 3 as to whether the creation of certificate information has been completed. Note that the roadside communication apparatus 3 that is utilized by the in-vehicle communication apparatus 10 at this time may be the same roadside communication apparatus 3 utilized when making the issuance request or may be different. The certificate issuing server apparatus 5, having received the inquiry, sends a response indicating that certificate information creation has not been completed if that is the case, and transmits the certificate information to the roadside communication apparatus 3 if creation has been completed. The roadside communication apparatus 3 thereby receives one or a plurality of pieces of certificate information to be transmitted to the vehicle 1 from the certificate issuing server apparatus 5, and transmits the certificate information to the in-vehicle communication apparatus 10 of the vehicle 1 while adjusting the combined number and the transmission frequency based on vehicle information of the vehicle 1 as described above.

Note that, with regard to certificate information whose transmission to the vehicle 1 is completed, completion of transmission is notified from the roadside communication apparatus 3 to the certificate issuing server apparatus 5, and the certificate issuing server apparatus 5 is able to erase the certificate information whose transmission is completed from the storage unit 62. In a case such as where the vehicle 1 travels out of the communicable range of the roadside communication apparatus 3 before transmission of all of the certificate information is completed, for example, the in-vehicle communication apparatus 10 again makes an inquiry to the certificate issuing server apparatus 5 via another roadside communication apparatus 3, and the certificate information is thereby transmitted from the certificate issuing server apparatus 5 to the in-vehicle communication apparatus 10 via the roadside communication apparatus 3 with a similar procedure.

Next, the procedure of processing for transmitting and receiving certificate information that is performed in the road-vehicle communication system according to the present embodiment will be described using a flowchart. Note that, hereinafter, the procedure that is performed after the in-vehicle communication apparatus 10 of the vehicle 1 has inquired whether the creation of certificate information has been completed via the roadside communication apparatus 3, the certificate issuing server apparatus 5 has transmitted a plurality of pieces of created certificate information to the roadside communication apparatus 3 in response to this inquiry, and the roadside communication apparatus 3 has received this certificate information will be described.

Figure 8:
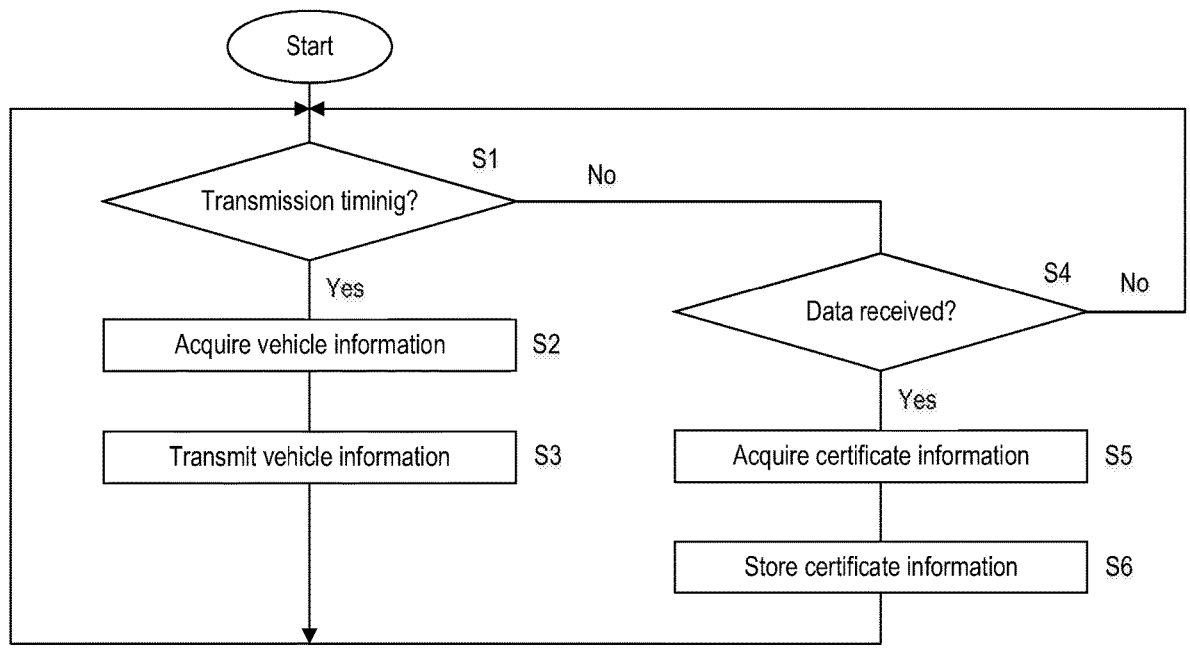
FIG. 8 is a flowchart showing the procedure of processing that is performed by the in-vehicle communication apparatus.

FIG. 8 is a flowchart showing the procedure of processing that is performed by the in-vehicle communication apparatus 10. The in-vehicle communication apparatus 10 according to the present embodiment periodically performs transmission of the wireless signal targeted to roadside communication apparatuses 3. The processing unit 11 of the in-vehicle communication apparatus 10 determines whether the timing for transmitting the wireless signal targeted to roadside communication apparatuses 3 has arrived (step S1). If the transmission timing of the wireless signal has arrived (S1: YES), the vehicle information acquisition unit 21 of the processing unit 11 acquires vehicle information such as the speed of the vehicle 1 that is obtained via the internal communication unit 13 and the position of the vehicle 1 that is obtained via the GPS reception unit 15 (step S2). The vehicle information transmission unit 22 of the processing unit 11 transmits the vehicle information acquired in step S2 to the roadside communication apparatus 3 with the road-vehicle communication unit 14 (step S3), and returns the processing to step S1.

If the transmission timing of the wireless signal targeted to roadside communication apparatuses 3 has not arrived (S1: NO), the processing unit 11 determines whether data that is transmitted from the roadside communication apparatus 3 has been received with the road-vehicle communication unit 14 (step S4). If data has not been received (S4: NO), the processing unit 11 returns the processing to step S1, and waits until the transmission timing arrives or data is received. If data has been received (S4: YES), the certificate information acquisition processing unit 23 of the processing unit 11 acquires the certificate information included in the received data (step S5), stores the acquired certificate information in the storage unit 12 (step S6), and returns the processing to step S1.

Figures 9, 10:
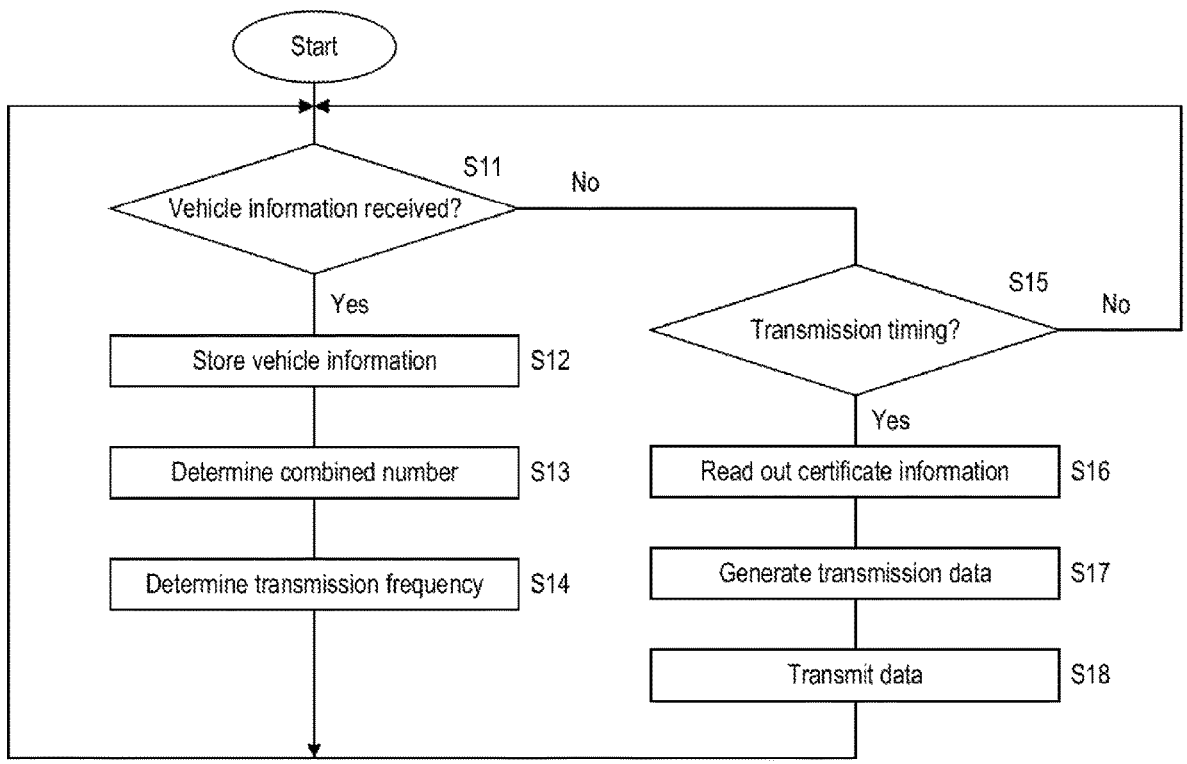
FIG. 9 is a flowchart showing the procedure of processing that is performed by the roadside communication apparatus.
FIG. 10 is a schematic diagram for describing the necessity of certificate information that is transmitted as vehicle information by the in-vehicle communication apparatus in the road-vehicle communication system according to a variation.

FIG. 9 is a flowchart showing the procedure of processing that is performed by the roadside communication apparatus 3. The vehicle information reception unit 41 of the processing unit 31 of the roadside communication apparatus 3 according to the present embodiment determines whether vehicle information from the in-vehicle communication apparatus 10 has been received with the road-vehicle communication unit 33 (step S11). If vehicle information has been received (S11: YES), the vehicle information reception unit 41 stores the received vehicle information in the storage unit 32 (step S12). Next, the combined number adjustment unit 44 of the processing unit 31 determines the number of pieces of certificate information to be included in data that is to be transmitted to the in-vehicle communication apparatus 10, that is, the combined number, based on vehicle information stored in the storage unit 32 (step S13). Also, the transmission frequency adjustment unit 45 of the processing unit 31 determines the cycle for transmitting data including the certificate information to the in-vehicle communication apparatus 10, that is, the transmission frequency, based on vehicle information stored in the storage unit 32 (step S14), and returns the processing to step S11.

If vehicle information has not been received from the in-vehicle communication apparatus 10 (S11: NO), the processing unit 31 determines whether the timing for transmitting data including the certificate information to the in-vehicle communication apparatus 10 has arrived (step S15). Note that this transmission timing is timing decided based on the transmission cycle determined by the transmission frequency adjustment unit 45 in step S14. If the transmission timing has not arrived (S15: NO), the processing unit 31 returns the processing to step S11, and waits until vehicle information is received or the transmission timing of data arrives. If the transmission timing has arrived (S15: YES), the transmission data generation unit 42 of the processing unit 31 reads out pieces of certificate information 32a of the combined number determined in step S13 from the certificate information 32a stored in the storage unit 32 (step S16).

The transmission data generation unit 42 generates transmission data by combining the certificate information 32a that is read out and loading information such as a header, footer and the like (step S17). Next, the data transmission unit 43 of the processing unit 31 transmits the transmission data generated by the transmission data generation unit 42 to the in-vehicle communication apparatus 10 with the road-vehicle communication unit 33 (step S18), and returns the processing to step S11.

In the road-vehicle communication system according to the present embodiment having the above configuration, the in-vehicle communication apparatus 10 mounted in a vehicle 1 transmits vehicle information related to this vehicle 1 to the roadside communication apparatus 3 installed on the road. The roadside communication apparatus 3 stores a plurality of pieces of certificate information 32a to be transmitted to the in-vehicle communication apparatus 10 in the storage unit 32, combines a plurality of pieces of stored certificate information 32a to generate transmission data, and transmits the generated transmission data to the in-vehicle communication apparatus 10. At this time, the roadside communication apparatus 3 adjusts the number of pieces of certificate information 32a to be combined as transmission data, based on vehicle information received from the in-vehicle communication apparatus 10. In the case where the number of pieces of certificate information to be combined is large, it is possible to transmit a large amount of certificate information at one time, but since the data length of the transmission data increases, there is an increased possibility of transmission failure during transmission. In the case where the number of pieces of certificate information to be combined is small, transmission failure tends not to occur since transmission can be completed in a short time, but the number of pieces of certificate information that can be transmitted at one time decreases and the frequency at which transmission is performed increases.

With the road-vehicle communication system according to the present embodiment, it becomes possible for the roadside communication apparatus 3 to, for example, judge whether wireless communication with the in-vehicle communication apparatus 10 can be stably performed, based on vehicle information received from the in-vehicle communication apparatus 10, and adjust the number of pieces of certificate information to be combined as transmission data based on the judgment result.

Also, with the road-vehicle communication system according to the present embodiment, the speed of the vehicle 1 is transmitted as vehicle information from the in-vehicle communication apparatus 10 to the roadside communication apparatus 3. In the case where the vehicle speed is high, there is a possibility of not being able to stably perform wireless communication between the roadside communication apparatus 3 and the in-vehicle communication apparatus 10. In view of this, the roadside communication apparatus 3 adjusts the combined number, so as to increase the number of pieces of certificate information to be combined for a slower vehicle speed and to reduce the number of pieces of certificate information to be combined for a faster vehicle speed. The occurrence of problems such as failure during data transmission from the roadside communication apparatus 3 to the in-vehicle communication apparatus 10 can thereby be suppressed.

Also, with the road-vehicle communication system according to the present embodiment, when the roadside communication apparatus 3 performs data transmission to the in-vehicle communication apparatus 10, the frequency at which data transmission is performed is adjusted, based on vehicle information received from the in-vehicle communication apparatus 10. Increasing the communication frequency to one in-vehicle communication apparatus 10 enables retransmission to be quickly performed even if data transmission fails, although there is a possibility of issues arising in data transmission to other in-vehicle communication apparatuses 10 due to the increased amount of communication. Reducing the communication frequency to the in-vehicle communication apparatuses 10 enables an increase in the amount of communication to be suppressed, but it takes time to perform retransmission in the case where data transmission fails.

With the road-vehicle communication system according to the present invention, it becomes possible for the roadside communication apparatus 3 to, for example, judge whether wireless communication with the in-vehicle communication apparatus 10 can be stably performed, based on vehicle information received from the in-vehicle communication apparatus 10, and adjust the transmission frequency of data based on the judgment result.

Also, with the road-vehicle communication system according to the present embodiment, position information of the vehicle 1 is transmitted as vehicle information from the in-vehicle communication apparatus 10 to the roadside communication apparatus 3. In the case where the vehicle 1 is located at a distance from the roadside communication apparatus 3, there is a possibility of the vehicle 1 travelling out of communication range of the roadside communication apparatus 3. In view of this, the roadside communication apparatus 3 adjusts the transmission frequency, so as to increase the transmission frequency for a longer distance to the vehicle and to reduce the transmission frequency for a shorter distance. The occurrence of a state in which the roadside communication apparatus 3 becomes unable to communicate with the in-vehicle communication apparatus 10 before transmission of data to be transmitted to the in-vehicle communication apparatus 10 is all completed can thereby be suppressed.

Note that, in the present embodiment, a configuration is adopted in which certificate information is transmitted from the roadside communication apparatus 3 to the in-vehicle communication apparatus 10, but the information that is transmitted is not limited to certificate information. The roadside communication apparatus 3 may transmit any information that is only transmitted to a specific in-vehicle communication apparatus 10, rather than simultaneously transmitting information to a plurality of in-vehicle communication apparatuses 10. Also, in the present embodiment, a configuration is adopted in which the roadside communication apparatus 3 performs adjustment of the combined number of certificate information and adjustment of the transmission frequency of data, but the present invention is not limited thereto, and the roadside communication apparatus 3 may be configured to perform only one of adjustment of the combined number and adjustment of the transmission frequency.

Also, in the present embodiment, a configuration is adopted in which the speed and position of the vehicle 1 is transmitted as vehicle information from the in-vehicle communication apparatus 10 to the roadside communication apparatus 3, but the vehicle information that is transmitted is not limited thereto. For example, the vehicle information that is transmitted from the in-vehicle communication apparatus 10 to the roadside communication apparatus 3 may include information such as the travel direction, acceleration, planned travel route and/or destination of the vehicle 1. By taking into consideration the travel direction of the vehicle 1, for example, the roadside communication apparatus 3 is thereby able to judge whether the vehicle 1 is moving closer to or away from the roadside communication apparatus 3, and to perform adjustment such as increasing the transmission frequency for vehicles 1 that are moving away and reducing the transmission frequency for vehicles 1 that are moving closer.

Variation

In the road-vehicle communication system according to a variation, the vehicle information that is transmitted from the in-vehicle communication apparatus 10 to the roadside communication apparatus 3 includes information relating to the necessity of certificate information, in addition to information on the speed and position of the vehicle 1. FIG. 10 is a schematic diagram for describing the necessity of certificate information that is transmitted as vehicle information by the in-vehicle communication apparatus 10 in the road-vehicle communication system according to the variation. The in-vehicle communication apparatus 10 according to the variation compares the period of validity (expiration date) attached to the certificate information held thereby, for example, with the current date-time, and calculates the remaining period for which this certificate information can be used. The in-vehicle communication apparatus 10 sets the necessity of certificate information to 0 if the remaining period of the certificate information is one month or more, sets the necessity to 1 if the remaining period is less than one month and one week or more, sets the necessity to 2 if the remaining period is less than one week, and sets the necessity to 3 if the period of validity has already ended (expired). The in-vehicle communication apparatus 10 according to the variation transmits the necessity of certificate information determined in this way to the roadside communication apparatus 3 as vehicle information, together with the information on the speed and position of the vehicle 1.

The roadside communication apparatus 3 that receives the vehicle information from the in-vehicle communication apparatus 10 adjusts the frequency at which data transmission to the in-vehicle communication apparatus 10 is performed, according to the necessity of certificate information included in the vehicle information. The roadside communication apparatus 3 according to the variation first determines the frequency (transmission cycle) of data transmission to the in-vehicle communication apparatus 10, as shown in FIG. 6, according to the distance to the in-vehicle communication apparatus 10 that is calculated from the position information included in the vehicle information. Next, the roadside communication apparatus 3 further adjusts the transmission cycle determined according to the distance, according to the necessity included in the vehicle information. For example, the roadside communication apparatus 3 is able to adjust the transmission cycle such that the transmission cycle is shorter for a higher necessity. In the case of determining the transmission cycle in five steps as shown in FIG. 6, the roadside communication apparatus 3 according to the variation shortens the transmission cycle by one step if the necessity is 1, shortens the transmission cycle by two steps if the necessity is 2, and shortens the transmission cycle by three steps if the necessity is 3.

In the road-vehicle communication system according to the variation having the above configuration, by including the necessity of certificate information in the vehicle information that is transmitted from the in-vehicle communication apparatus 10 to the roadside communication apparatus 3, it becomes possible for the roadside communication apparatus 3 to preferentially perform data transmission to an in-vehicle communication apparatus 10 that needs certificate information more.

Note that, in the road-vehicle communication system according to an above-mentioned variation, a configuration is adopted in which the frequency of data transmission from the roadside communication apparatus 3 to the in-vehicle communication apparatus 10 is adjusted according to the necessity of certificate information, but the present invention is not limited thereto. The roadside communication apparatus 3 may be configured to adjust the combined number of certificate information according to the necessity, such as increasing the combined number of certificate information for a higher necessity of certificate information, for example, or to perform both adjustment of the transmission frequency and adjustment of the combined number according to the necessity. Also, a configuration may be adopted in which, rather than the necessity of certificate information being transmitted from the in-vehicle communication apparatus 10 to the roadside communication apparatus 3, the period of validity of certificate information is transmitted, and the roadside communication apparatus 3 that receives the period of validity determines the necessity.

Second Embodiment

Figure 11:
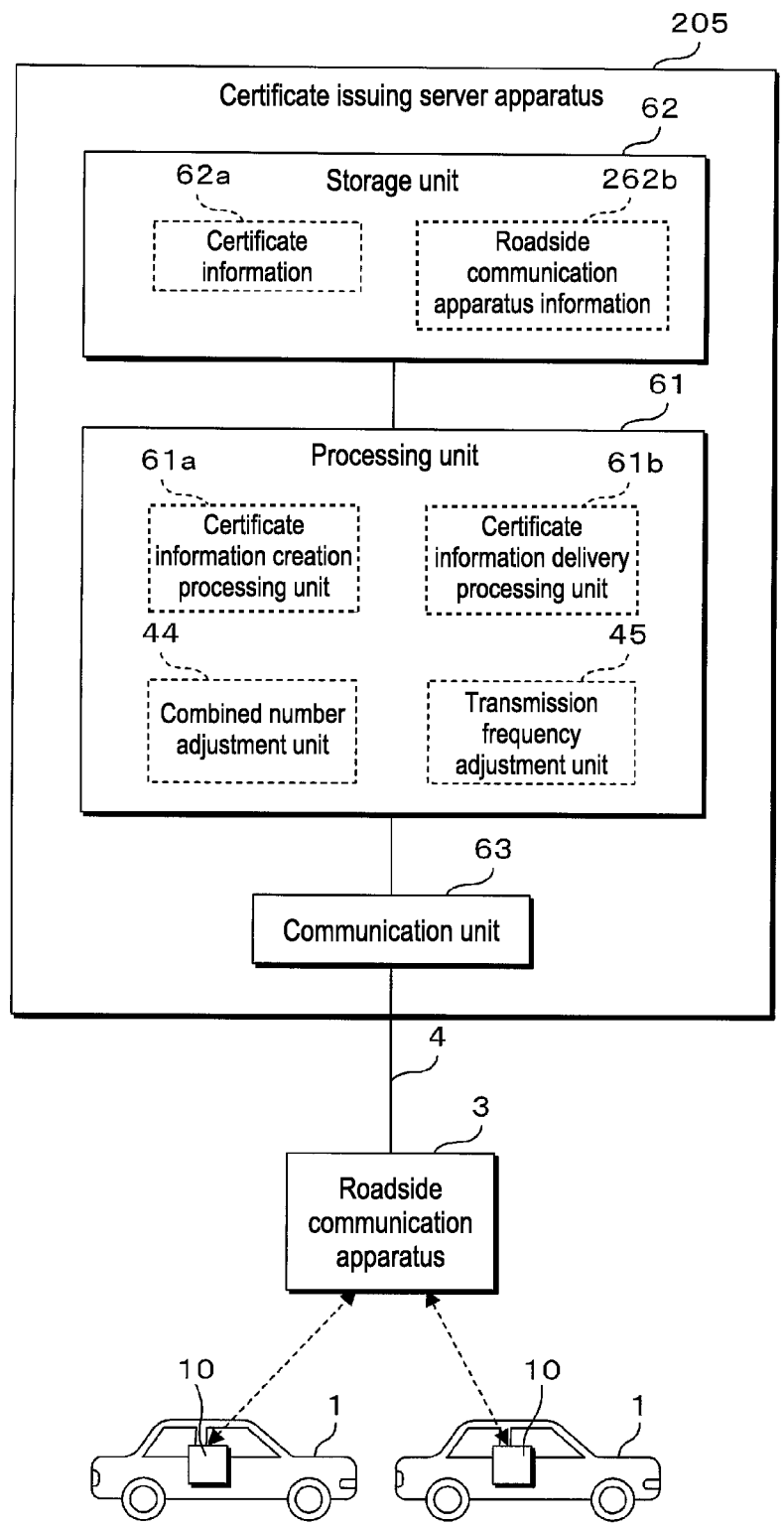
FIG. 11 is a block diagram showing the configuration of the certificate issuing server apparatus according to a second embodiment.

FIG. 11 is a block diagram showing the configuration of a certificate issuing server apparatus 205 according to a second embodiment. In the road-vehicle communication system according to the second embodiment, the certificate issuing server apparatus 205, rather than the roadside communication apparatus 3, performs processing for adjusting the combined number of certificate information and the frequency of data transmission based on vehicle information transmitted by the in-vehicle communication apparatus 10. The roadside communication apparatus 3 according to the second embodiment, in the case where vehicle information is received from the in-vehicle communication apparatus 10 of a vehicle 1, thus transmits this vehicle information to the certificate issuing server apparatus 205. In the certificate issuing server apparatus 205 according to the second embodiment, the combined number adjustment unit 44 and the transmission frequency adjustment unit 45 are provided in the processing unit 61. The certificate issuing server apparatus 205 that receives the vehicle information relayed by the roadside communication apparatus 3 determines the combined number of certificate information using the combined number adjustment unit 44, and determines the frequency of data transmission using the transmission frequency adjustment unit 45, based on the received vehicle information. The certificate issuing server apparatus 205 notifies the combined number and transmission frequency that are determined to the roadside communication apparatus 3, and the roadside communication apparatus 3 that receives this notification performs transmission of certificate information to the in-vehicle communication apparatus 10 with the combined number and transmission frequency determined by the certificate issuing server apparatus 205.

Also, the certificate issuing server apparatus 205 according to the second embodiment further performs adjustment of the combined number and transmission frequency that depends on the communication capability of the roadside communication apparatus 3 that will transmit the certificate information, in addition to adjustment of the combined number and transmission frequency that depends on the speed and position of the vehicle 1 that are provided as vehicle information. FIG. 12 is a schematic diagram for describing the adjustment processing that depends on the communication capability of the roadside communication apparatus 3 and is performed by the certificate issuing server apparatus 205 according to the second embodiment. In the present example, the communication capability of the roadside communication apparatus 3 is graded into three steps 1 to 3, with a larger numerical value indicating a higher communication capability. Also, the communication capability of the roadside communication apparatus 3 is not only the capability of the apparatus indicated by the strength of wireless signals that can be output by the roadside communication apparatus 3 or the communicable range of the roadside communication apparatus 3, for example, but is also determined with consideration for factors such as the surrounding environment in which the roadside communication apparatus 3 is installed. Even in the case where the same apparatus is used as the roadside communication apparatus 3, the communication capability can be regarded as low if a large number of buildings that block wireless signals are located in the surrounding area, for example.

The certificate issuing server apparatus 205 stores the communication capability of one or a plurality of roadside communication apparatuses 3 that can be targeted for adjustment in the storage unit 62 as roadside communication apparatus information 262*b*. The communication capability of each roadside communication apparatus 3 is determined in advance by the designer of the road-vehicle communication system or the installer of the roadside communication apparatus 3, for example, based on simulation, measurement or the like, and stored in the storage unit 62 as the roadside communication apparatus information 262*b*.

The certificate issuing server apparatus 205 according to the second embodiment first determines the number of pieces of certificate information to be combined by the roadside communication apparatus 3, as shown in FIG. 5, based on the vehicle speed included in the vehicle information received from the roadside communication apparatus 3. Next, the certificate issuing server apparatus 205 further adjusts the combined number determined according to the vehicle speed, according to the communication capability of the roadside communication apparatus 3 that will perform data transmission to the in-vehicle communication apparatus 10. For example, the certificate issuing server apparatus 205 is able to adjust the combined number such that the combined number is smaller for a lower communication capability and the combined number is larger for a higher communication capability. In the case of determining the combined number in ten steps as shown in FIG. 5, the certificate issuing server apparatus 205 according to the second embodiment reduces the combined number by one step if the communication capability of the roadside communication apparatus 3 is set to 1, and increases the combined number by one step if the communication capability is set to 3.

Similarly, the certificate issuing server apparatus 205 according to the second embodiment determines the cycle of data transmission to the in-vehicle communication apparatus 10 by the roadside communication apparatus 3, as shown in FIG. 6, based on the position information included in the vehicle information received from the roadside communication apparatus 3. Next, the certificate issuing server apparatus 205 further adjusts the transmission cycle determined according to the distance from the roadside communication apparatus 3 to the vehicle 1, according to the communication capability of the roadside communication apparatus 3 that will perform data transmission to the in-vehicle communication apparatus 10. For example, the certificate issuing server apparatus 205 is able to adjust the combined number such that the transmission cycle is shorter for a lower communication capability and the transmission cycle is longer for a higher communication capability. In the case of determining the transmission cycle in five steps as shown in FIG. 6, the certificate issuing server apparatus 205 according to the second embodiment shortens the transmission cycle by one step if the communication capability of the roadside communication apparatus 3 is set to 1, and lengthens the transmission cycle by one step if the communication capability is set to 3.

In the road-vehicle communication system according to the second embodiment having the above configuration, a configuration is adopted in which the roadside communication apparatus 3 transmits vehicle information received from the in-vehicle communication apparatus 10 to the certificate issuing server apparatus 205, the certificate issuing server apparatus 205 performs adjustment of the combined number of certificate information and adjustment of the data transmission frequency that depend on the vehicle information, and the roadside communication apparatus 3 performs combination of certificate information and transmission of data according to the adjustment result. Also, the certificate issuing server apparatus 205 stores information relating to the communication capability of the roadside communication apparatus 3, and performs adjustment of the combined number and adjustment of the data transmission frequency with consideration for the communication capability of the roadside communication apparatus 3 that is targeted for adjustment. In the road-vehicle communication system, adjustment of the combined number and adjustment of the data transmission frequency suitable for the communication capability of the roadside communication apparatus 3 can be performed.

Note that, in the second embodiment, a configuration is adopted in which the communication capability of the roadside communication apparatus 3 is determined in advance and stored in the storage unit 62 of the certificate issuing server apparatus 205 as the roadside communication apparatus information 262b, but the present invention is not limited thereto. For example, the certificate issuing server apparatus 205 may be configured to acquire information such as history information of wireless communication with vehicles 1 by the roadside communication apparatus 3, and determine the communication capability of the roadside communication apparatus 3 by calculating the success rate, failure rate or the like of wireless communication from this information. Also, in the second embodiment, a configuration is adopted in which the certificate issuing server apparatus 205 performs the adjustment processing, but the present invention is not limited thereto. A server apparatus other than the certificate issuing server apparatus 205, such as a server apparatus that manages road traffic information or a server apparatus that manages the traffic lights 2, for example, may perform the adjustment processing, or a dedicated server apparatus for performing the adjustment processing, for example, may be provided. Also, in the second embodiment, a configuration is adopted in which the certificate issuing server apparatus 205 notifies the combined number that is determined to the roadside communication apparatus 3, and the roadside communication apparatus 3 performs processing for combining a plurality of pieces of certificate information to generate transmission data, but the present invention is not limited thereto. For example, a configuration may be adopted in which the certificate issuing server apparatus 205 determines the combined number of certificate information, and delivers information obtained by combining a plurality of pieces of certificate information according to the combined number that is determined to the roadside communication apparatus 3.

Also, since the other constituent elements of the road-vehicle communication system according to the second embodiment are similar to the road-vehicle communication system according to the first embodiment, the same reference numerals are given to similar parts, and a detailed description thereof is omitted.

The invention claimed is:

1. A road-vehicle communication system comprising an in-vehicle communication apparatus mounted in a vehicle and a roadside communication apparatus installed on a road,
wherein the in-vehicle communication apparatus has a vehicle information transmission unit configured to transmit vehicle information related to the vehicle,
the roadside communication apparatus has:
a storage unit configured to store a plurality of pieces of data and a plurality of pieces of certificate information to be transmitted to the in-vehicle communication apparatus;
a vehicle information reception unit configured to receive vehicle information transmitted from the in-vehicle communication apparatus;
a transmission data generation unit configured to combine a plurality of pieces of certificate information stored in the storage unit to generate a single piece of transmission data; and
a data transmission unit configured to transmit the data generated by the transmission data generation unit to the in-vehicle communication apparatus, and
the road-vehicle communication system comprises a combined number adjustment unit configured to adjust the number of pieces of certificate information to be combined by the transmission data generation unit so as to adjust the size of the single piece of transmission data, based on vehicle information received by the vehicle information reception unit.

2. The road-vehicle communication system according to claim 1,
wherein the vehicle information transmission unit transmits speed information of the vehicle, and
the combined number adjustment unit increases the number of pieces of certificate information to be combined for a slower speed of the vehicle in which the in-vehicle communication apparatus serving as a data transmission destination is mounted, and decreases the number of pieces of certificate to be combined for a faster speed.

3. The road-vehicle communication system according to claim 1, comprising a transmission frequency adjustment unit configured to adjust a frequency at which the data transmission unit transmits data to the in-vehicle communication apparatus, based on vehicle information received by the vehicle information reception unit.

4. The road-vehicle communication system according to claim 3,
wherein the vehicle information transmission unit transmits position information on the vehicle, and
the transmission frequency adjustment unit increases the transmission frequency for a longer distance to the vehicle in which the in-vehicle communication apparatus serving as a data transmission destination is mounted, and decreases the transmission frequency for a shorter distance.

5. The road-vehicle communication system according to claim 3,
wherein the vehicle information transmission unit transmits information related to a necessity of data that is transmitted by the roadside communication apparatus, and
the combined number adjustment unit or the transmission frequency adjustment unit performs adjustment according to the necessity.

6. The road-vehicle communication system according to claim 3, wherein the roadside communication apparatus has the transmission frequency adjustment unit.

7. The road-vehicle communication system according to claim 3, further comprising a server apparatus configured to deliver a plurality of pieces of data to be transmitted to the in-vehicle communication apparatus to the roadside communication apparatus, wherein the server apparatus has the transmission frequency adjustment unit.

8. The road-vehicle communication system according to claim 7,
wherein the server apparatus delivers data to a plurality of the in-vehicle communication apparatus, and
the transmission frequency adjustment unit adjusts the transmission frequency according to information related to the roadside communication apparatus.

9. The road-vehicle communication system according to claim 1, wherein the roadside communication apparatus has the combined number adjustment unit.

10. The road-vehicle communication system according to claim 1, further comprising a server apparatus configured to deliver a plurality of pieces of data to be transmitted to the in-vehicle communication apparatus to the roadside communication apparatus,
wherein the server apparatus has the combined number adjustment unit.

11. The road-vehicle communication system according to claim 10,
wherein the server apparatus delivers data to a plurality of the in-vehicle communication apparatus, and
the combined number adjustment unit adjusts the combined number according to information related to the roadside communication apparatus.

12. A road-vehicle communication system comprising an in-vehicle communication apparatus mounted in a vehicle and a roadside communication apparatus installed on a road,
wherein the in-vehicle communication apparatus has a vehicle information transmission unit configured to transmit vehicle information related to the vehicle,
the roadside communication apparatus has:
a storage unit configured to store a plurality of pieces of certificate information to be transmitted to the in-vehicle communication apparatus;
a vehicle information reception unit configured to receive vehicle information transmitted from the in-vehicle communication apparatus;
a transmission data generation unit configured to combine a plurality of pieces of certificate information stored in the storage unit to generate a single piece of transmission data; and
a data transmission unit configured to transmit the data generated by the transmission data generation unit to the in-vehicle communication apparatus, and
the road-vehicle communication system comprises a transmission frequency adjustment unit configured to adjust a frequency at which the data transmission unit transmits data to the in-vehicle communication apparatus, based on vehicle information received by the vehicle information reception unit.

13. A roadside communication apparatus configured to be installed on a road and to communicate with an in-vehicle communication apparatus mounted in a vehicle, comprising:
a storage unit configured to store a plurality of pieces of data and a plurality of pieces of certificate information to be transmitted to the in-vehicle communication apparatus;
a vehicle information reception unit configured to receive vehicle information transmitted from the in-vehicle communication apparatus;
a transmission data generation unit configured to combine a plurality of pieces of data stored in the storage unit to generate a single piece of transmission data;
a data transmission unit configured to transmit the data generated by the transmission data generation unit to the in-vehicle communication apparatus; and
a combined number adjustment unit configured to adjust the number of pieces of certificate information to be combined by the transmission data generation unit so as to adjust the size of the single piece of transmission data, based on vehicle information received by the vehicle information reception unit.

14. The roadside communication apparatus according to claim 13, comprising a transmission frequency adjustment unit configured to adjust a frequency at which the data transmission unit transmits data to the in-vehicle communication apparatus, based on vehicle information received by the vehicle information reception unit.

15. An in-vehicle communication apparatus configured to be mounted in a vehicle and to communicate with a roadside communication apparatus installed on a road, comprising:
a vehicle information transmission unit configured to transmit vehicle information related to the vehicle to the roadside communication apparatus,
wherein the vehicle information transmission unit transmits speed information of the vehicle, position information on the vehicle, and/or information related to a necessity of certificate information that is transmitted by the roadside communication apparatus.

16. A road-vehicle communication method for transmitting predetermined data from a roadside communication apparatus installed on a road to an in-vehicle communication apparatus mounted in a vehicle, the method comprising:
the in-vehicle communication apparatus transmitting vehicle information related to the vehicle,
the roadside communication apparatus storing a plurality of pieces of data and a plurality of pieces of certificate information to be transmitted to the in-vehicle communication apparatus,
the roadside communication apparatus combining a plurality of pieces of stored certificate information to generate a single piece of transmission data, and transmitting the generated data to the in-vehicle communication apparatus, and
the roadside communication apparatus, at a time of generating the transmission data, adjusting the number of pieces of data to be combined based on vehicle information received from the in-vehicle communication apparatus.

17. The road-vehicle communication method according to claim 16, comprising:
the roadside communication apparatus, at a time of transmitting the transmission data to the in-vehicle communication apparatus, adjusting a frequency at which data is transmitted to the in-vehicle communication apparatus based on vehicle information received from the in-vehicle communication apparatus.

* * * * *